(12) United States Patent
Jin

(10) Patent No.: US 11,098,388 B2
(45) Date of Patent: Aug. 24, 2021

(54) ALUMINUM HYDROXIDE SOLAR POWERED THERMAL REDUCTION DEVICE FOR ALUMINUM-AIR FUEL CELL

(71) Applicants: LANZHOU JINFULE BIOTECHNOLOGY CO. LTD., Gansu (CN); SPRING POWER LIMITED, Tortola (VG)

(72) Inventor: Jifan Jin, Gansu (CN)

(73) Assignees: LANZHOU JINFULE BIOTECHNOLOGY CO. LTD., Lanzhou Gansu (CN); SPRING POWER LIMITED, Tortola (VG)

( * ) Notice: Subject to any disclaimer, the term of this patent is extended or adjusted under 35 U.S.C. 154(b) by 238 days.

(21) Appl. No.: 16/307,464

(22) PCT Filed: May 9, 2017

(86) PCT No.: PCT/CN2017/083575
§ 371 (c)(1),
(2) Date: Dec. 5, 2018

(87) PCT Pub. No.: WO2017/211156
PCT Pub. Date: Dec. 14, 2017

(65) Prior Publication Data
US 2019/0301032 A1    Oct. 3, 2019

(30) Foreign Application Priority Data
Jun. 6, 2016    (CN) .......................... 201610395159.7

(51) Int. Cl.
C25C 3/08    (2006.01)
C22B 21/02    (2006.01)
(Continued)

(52) U.S. Cl.
CPC ................ *C22B 21/02* (2013.01); *C22B 5/02* (2013.01); *C22B 21/0038* (2013.01); *C25C 3/08* (2013.01);
(Continued)

(58) Field of Classification Search
CPC ....... C22B 21/0038; C22B 21/02; C22B 5/02; C25C 3/08; F24S 21/00; Y02E 10/40
(Continued)

(56) References Cited

U.S. PATENT DOCUMENTS 4,181,584 A * 1/1980 Steiger ..................... C25C 3/06
205/378
4,472,367 A   9/1984 Gibson et al.
(Continued)

FOREIGN PATENT DOCUMENTS

CN    1419611 A    5/2003
CN    1615378 A    5/2005
(Continued)

OTHER PUBLICATIONS

International Search Report and Written Opinion dated Jul. 14, 2017 in International Application No. PCT/CN2017/083575.

*Primary Examiner* — Scott R Kastler
*Assistant Examiner* — Michael Aboagye
(74) *Attorney, Agent, or Firm* — Knobbe, Martens, Olson & Bear LLP

(57) ABSTRACT

The present invention provides an apparatus for preparing a metal based on solar energy thermal reduction. The apparatus includes a solar energy collection and photothermal conversion system and a thermal reduction system. The solar energy collection and photothermal conversion system includes: a solar energy collection device (1), a solar energy concentration device (2), and a solar energy transfer device (3) or a photothermal conversion and transfer device. The
(Continued)

thermal reduction system includes: a metal reduction chamber (15), an electric field and/or magnetic field generation device (15-3), and a separation and cooling device (15-4). The solar energy collection and photothermal conversion system transfers sunlight or heat to the metal reduction chamber to decompose a metal oxide, and a product resulted from the decomposition is dissociated under the effect of an electric field/magnetic field, and a liquid metal is obtained upon cooling. The apparatus further includes a waste heat recovery and recycle system. According to the present invention, the metal oxide is heated and decomposed by directly using the solar energy, which improves energy utilization rate, greatly prevents environmental pollution and energy waste, and has a great application prospect.

26 Claims, 7 Drawing Sheets

(51) Int. Cl.
- *C22B 5/02* (2006.01)
- *C22B 21/00* (2006.01)
- *F24S 21/00* (2018.01)
- *H01M 12/02* (2006.01)
- *H01M 12/06* (2006.01)

(52) U.S. Cl.
CPC .............. *F24S 21/00* (2018.05); *H01M 12/02* (2013.01); *H01M 12/06* (2013.01); *Y02E 10/40* (2013.01)

(58) Field of Classification Search
USPC ............ 266/78, 161, 168; 60/641.8, 641.15; 126/635, 569, 690, 343.5 R, 714, 683
See application file for complete search history.

(56) References Cited

U.S. PATENT DOCUMENTS

| | | | |
|---|---|---|---|
| 4,627,418 A * | 12/1986 | Gibson | C01B 32/935 126/683 |
| 5,454,853 A * | 10/1995 | Edelson | C21C 5/52 75/10.43 |
| 6,409,894 B1 | 6/2002 | Boucard | |
| 9,279,188 B2 * | 3/2016 | Diver, Jr. | C25B 1/00 |
| 2005/0121316 A1 | 6/2005 | Molokov et al. | |
| 2013/0234069 A1 * | 9/2013 | Henry | F24S 23/70 252/372 |
| 2013/0319501 A1 * | 12/2013 | Hilliard | F24S 23/74 136/246 |
| 2015/0307963 A1 * | 10/2015 | Niwa | C22B 9/02 75/378 |

FOREIGN PATENT DOCUMENTS

| | | | | |
|---|---|---|---|---|
| CN | 102424873 A | 4/2012 | | |
| CN | 103851529 A | 6/2014 | | |
| CN | 204313506 U | 5/2015 | | |
| EP | 2728022 | * | 5/2014 | C22B 5/02 |

* cited by examiner

A-A1 sectional view

B-B1 sectional view

ALUMINUM HYDROXIDE SOLAR POWERED THERMAL REDUCTION DEVICE FOR ALUMINUM-AIR FUEL CELL

CROSS REFERENCE TO RELATED APPLICATIONS

This application is the U.S. National Phase under 35 U.S.C. § 371 of International Application No. PCT/CN2017/083575, filed on May 9, 2017, designating the U.S., and published as WO/2017/211156 on Dec. 14, 2017, which claims priority to Chinese Patent Application No. 201610395159.7, filed on Jun. 6, 2016. The content of each of these related applications is incorporated herein by reference in its entirety.

TECHNICAL FIELD

The present invention relates to thermal reduction apparatuses of metal oxides, and in particular, relates to reduction of metal hydroxides for batteries.

BACKGROUND

Aluminum hydroxide is generated after an aluminum-air fuel battery is discharged. The generated aluminum hydroxide needs to be converted into aluminum via reduction, such that charge of the aluminum-air fuel battery and recycle and reuse of the aluminum are achieved. The currently published reductions of aluminum hydroxides all involve heating and decomposing the aluminum hydroxides to generate alumina ($Al_2O_3$), further electrolyzing the alumina ($Al_2O_3$), which is also referred to as electrolytic aluminum, to obtain the aluminum, and then fabricating aluminum sheet electrodes for anode materials for the aluminum-air fuel battery. However, electrolysis of the aluminum consumes a large amount of electric energy. According to the current technique of aluminum electrolysis, 13000 KWh electric energy needs to be consumed for production of one ton of electrolytic aluminum. In 2014, the aluminum smelting power consumption reference published by China Ministry of Industry and Information Technology is 12500 KWh. However, each ton of aluminum releases a maximum of electric energy of 8100 KWh via the aluminum-air battery. If the aluminum hydroxides generated upon discharge of the aluminum-air fuel batteries are reduced by the process of electrolytic aluminum, a huge amount of energy needs to be consumed, and environmental pollution and shortage of electric energy may be caused.

Based on a previous invention application No. PCT/CN2015/096576 (entitled AIR-METAL FUEL BATTERY) in which a large amount of aluminum is used as anode materials in the air-aluminum fuel batteries and the aluminum hydroxides generated upon discharge of the batteries are reduced, the present invention provides an environmentally-friendly and recyclable solution and industrial system.

SUMMARY

In view of the above defects, the present invention is intended to provide an apparatus for preparing a metal based on solar energy thermal reduction.

To achieve the above objective, the present invention employs the following technical solution:

An apparatus for preparing a metal based on solar energy thermal reduction is provided. The apparatus includes a solar energy collection and photothermal conversion system and a thermal reduction system; wherein the solar energy collection and photothermal conversion system includes: a solar energy collection device, a solar energy concentration device, and a solar energy transfer device or a photothermal conversion and transfer device, wherein the solar energy collection device is configured to collect sunlight, the solar energy concentration device is connected to the solar energy collection device and is configured to concentrate the collected sunlight, the solar energy transfer device is connected to the solar energy collection device and is configured to transfer the concentrated sunlight, and the photothermal conversion and transfer device is connected to the solar energy concentration device and is configured to convert concentrated solar energy into thermal energy and transfer the thermal energy; and the thermal reduction system includes: a metal reduction chamber, an electric field and/or magnetic field generation device, and a separation and cooling device, wherein the metal reduction chamber is connected to the solar energy collection and photothermal conversion system and is configured to receive the solar energy or the thermal energy converted from the solar energy such that a metal oxide therein is heated and decomposed, the electric field and/or magnetic field generation device is configured to generate an electric field/magnetic field separated and decomposed product, and the separation and cooling device is configured to form a low temperature region for cooling the decomposed product and respectively generating a liquid metal and a gaseous oxygen. The electric field/magnetic field generation device is preferably an electric field generation device which generates an electric field to separate the decomposition product.

Further, a side region of the metal reduction chamber is connected to the solar energy transfer device or the photothermal conversion and transfer device, and is configured to transfer the sunlight concentrated by the solar energy collection and photothermal conversion system or the thermal energy converted from the solar energy to a heating region in an alumina reduction chamber.

Further, the electric field/magnetic field is located in a middle region in the metal reduction chamber.

Further, the separation and cooling device is located on another side region of the metal reduction chamber.

Further, the metal reduction chamber includes a metal discharge port and an oxygen discharge port.

Further, the apparatus further includes a metal recovery and storage chamber, wherein the metal recovery and storage chamber is connected to the metal discharge port of the metal reduction chamber, and a metal transfer device and a metal heat dissipation device are arranged on the metal recovery and storage chamber, the metal transfer device being configured to suction a metal liquid in the metal reduction chamber into the metal recovery and storage chamber, such that a temperature of the metal is further lowered under a cooling effect of the metal heat dissipation device, and the metal is stored into the metal recovery and storage chamber.

Further, the apparatus further includes a metal electrode preparation chamber, wherein the metal is transferred from the metal recovery and storage chamber to the metal electrode preparation chamber via an electrode transfer device, and the metal is prepared into a metal electrode having a desired specification in the metal electrode preparation chamber.

Further, the metal recovery and storage chamber is a hollow heat preservation box structure, and a housing of the metal recovery and storage chamber includes a heat preservation material.

Further, the apparatus further includes an oxygen recovery and storage chamber, wherein the oxygen recovery and storage chamber is provided with an oxygen transfer device and an oxygen heat dissipation device, the oxygen transfer device being configured to suction oxygen in the metal reduction chamber into the oxygen recovery and storage chamber, such that a temperature of the oxygen is further lowered under a cooling effect of the oxygen heat dissipation device, and the oxygen is temporarily stored into the oxygen recovery and storage chamber.

Further, a housing of the oxygen recovery and storage chamber includes a heat preservation material, and the oxygen recovery and storage chamber includes a feed port and an outlet port, the feed port of the oxygen recovery and storage chamber being connected to an oxygen transfer device, the outlet port of the oxygen recovery and storage chamber being connected to an oxygen processing and transfer device, and the oxygen processing and transfer device being configured to transfer oxygen in the oxygen recovery and storage chamber to a oxygen processing chamber.

Further, the apparatus further includes a metal oxide grinding and pre-heating mixing chamber, wherein the metal oxide grinding and pre-heating mixing chamber includes a feed port, an outlet port and a catalyst feed device, a grinding device is arranged in the metal oxide grinding and pre-heating mixing chamber, and a heating device is arranged on a wall of the mixing chamber, the outlet port of the metal oxide grinding and pre-heating mixing chamber being connected to a feed port of the metal reduction chamber.

Further, the apparatus further includes a metal hydroxide heating and decomposition chamber, wherein the metal hydroxide heating and decomposition chamber includes a feed port, an outlet port and a dehumidification device, a stirring device is arranged in the metal hydroxide heating and decomposition chamber, and a heating device is arranged on a wall of the metal hydroxide heating and decomposition chamber, the outlet port of the metal hydroxide heating and decomposition chamber being connected to the feed port of the metal oxide grinding and pre-heating mixing chamber via a metal oxide transfer device.

Further, the apparatus further includes a metal hydroxide collection grinding and drying chamber, wherein the metal hydroxide collection grinding and drying chamber includes a feed port and an outlet port, and a grinder and a dryer are arranged in the metal hydroxide collection grinding and drying chamber, the outlet port of the metal hydroxide collection grinding and drying chamber being connected to the feed port of the metal hydroxide heating and decomposition chamber via a metal hydroxide dry powder transfer device.

Further, the apparatus further includes a metal hydroxide collection and storage chamber, wherein the metal hydroxide collection and storage chamber includes a feed port and an outlet port, the outlet port of the metal hydroxide collection and storage chamber being connected to the feed port of the metal hydroxide collection grinding and drying chamber via a metal hydroxide transfer device.

Further, the photothermal conversion and transfer device includes a heat transfer pipe, a solar energy photothermal conversion device being arranged at one end of the heat transfer pipe by which the heat transfer pipe is connected to the solar energy concentration device and configured to convert light energy into thermal energy, and a heat release device being arranged on the other end of the heat transfer pipe and connected to the metal reduction chamber.

Further, the photothermal conversion and transfer device is a heat transfer pipe, one end of the heat transfer pipe being located at a focus of the solar energy concentration device, and the other end of the heat transfer pipe being connected to the metal reduction chamber.

Further, the heat transfer pipe is a superconducting heat pipe.

Further, the solar energy collection device, the solar energy concentration device, the solar energy transfer device or the photothermal conversion and transfer device constitute a photothermal conversion cell, and the solar energy collection photothermal conversion system includes a plurality of such photothermal conversion cells.

Further, the apparatus further includes a support and fixing device configured to support and fix the photothermal conversion cells.

Further, the solar energy collection device, the solar energy concentration device and the solar energy transfer device are closely connected or integrally arranged. These devices are closely and integrally connected, to prevent loss of energy during collection, concentration and transfer.

Further, one end of the solar energy transfer device by which the solar energy transfer device is connected to the solar energy concentration device is located at a focus of the solar energy concentration device.

Further, one side of the solar energy collection device by which the solar energy collection device collects the sunlight is provided with an automatic cleaning device.

Further, the apparatus further includes a sunlight automatic tracking device, wherein the sunlight automatic tracking device is configured to control directions of the solar energy collection device and the solar energy concentration device, such that more sunlight enters the solar energy collection device. This prevents losses of the sunlight due to blocking and reflection of the sunlight.

Further, the solar energy collection device is provided with a damage-triggered automatic alarming device.

Further, the apparatus further includes a heat recovery and recycle system, wherein the heat recovery and recycle system includes a waste heat recovery pipe, a heat transfer pipe, a waste heat distribution device and a solar energy thermal power generation device, the waste heat recovery pipe being connected to a cooling and/or heat dissipation device in the apparatus for preparing a metal based on solar energy thermal reduction and configured to transfer the heat via the heat transfer pipe, and the waste heat distribution device being configured to distribute the heat to a heat and/or thermal power generation device for power generation.

In the apparatus for preparing a metal based on solar energy thermal reduction according to the present invention, the prepared metal includes, but not limited to, aluminum, zinc, magnesium, lithium, iron, sodium or the like.

According to the present invention, on the premise of consuming no electric energy and causing no environmental pollution, the aluminum hydroxide is converted into the alumina by using abundant solar energy in nature, such that a charge course of the aluminum-air fuel battery is completed. In the course of converting the alumina into the aluminum according to the present invention, the solar energy of the sunlight is only converted into the thermal energy, and the alumina is then converted into the aluminum by using the thermal energy. In this entire process, the solar energy does not need to be firstly converted into the thermal energy and then converted into mechanical energy (solar energy power generation) or the solar energy does not need to be converted into the electric energy (photovoltaic power generation). Therefore, the loss of the solar energy according to the present invention is extremely low, and the utilization rate of the solar energy may reach 68%-80%, which is far higher than 29% (the cost is high and the projection workload is great) of the solar energy thermal power generation, and 18% (the cost is high, the conversion rate is not ideal, and environmental pollution is caused in the manufacture of the photovoltaic materials) of the solar energy photovoltaic power generation, and 13% (the cost is high, the conversion rate is low, and environmental pollution is caused in the manufacture of the thin film materials) of the solar energy thin film power generation. Therefore, the present invention discloses a technical of reducing the aluminum hydroxide, which is environmentally friendly and recyclable and has a low cost.

The present invention may also be applied to smelting of aluminum ores, and the aluminum ores are converted into aluminum. According to the present invention, the aluminum ores are converted to the aluminum by using abundant solar energy in nature. Therefore, environmental pollution may be reduced, the energy cost is effectively reduced, and the solution is also applicable to other metal ores.

DETAILED DESCRIPTION

Figure 1:
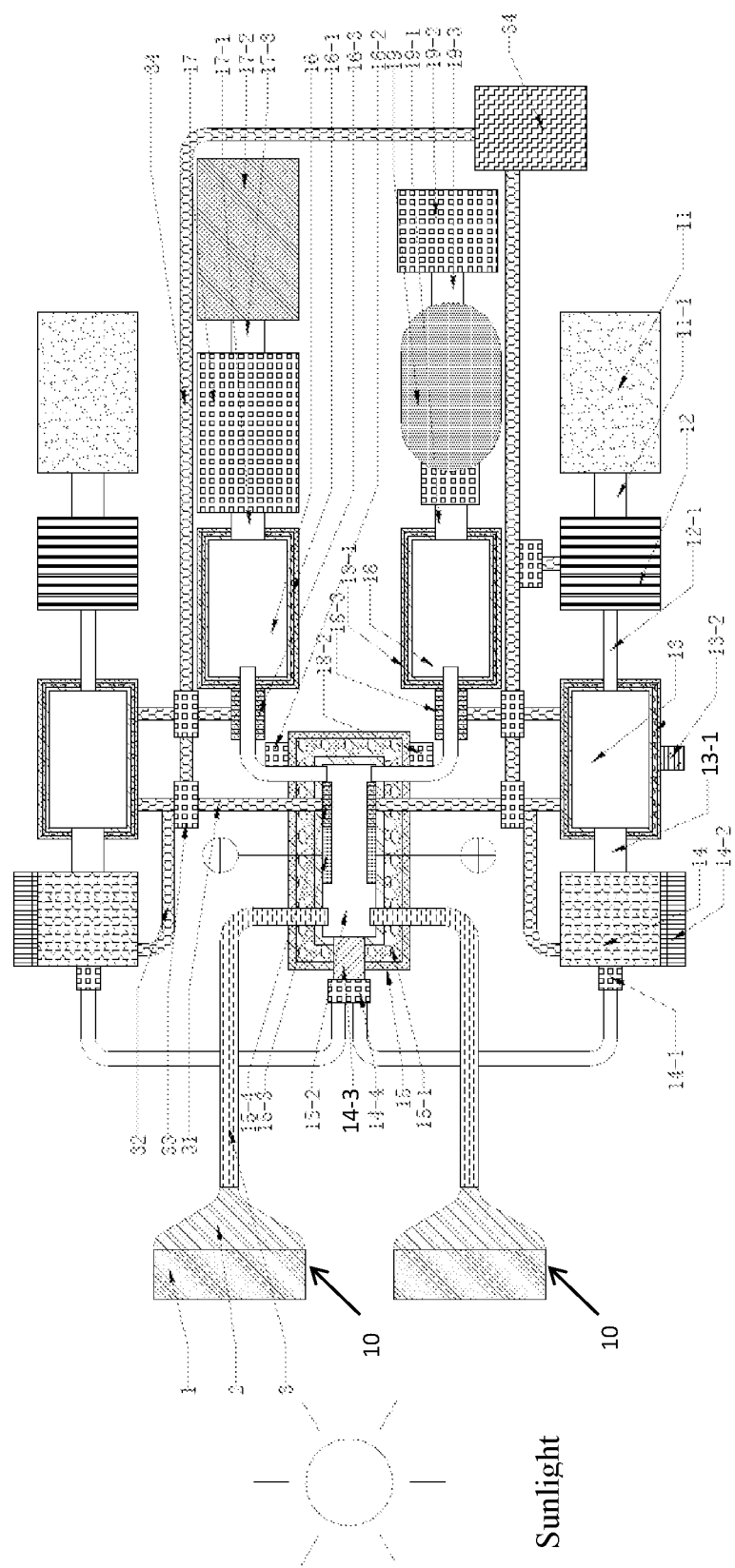
FIG. 1 is a schematic structural view of a solar energy thermal reduction apparatus of aluminum hydroxide for an aluminum-air fuel battery according to the present invention.

Hereinafter, the apparatus according to the present invention is described by using aluminum hydroxide from aluminum-air fuel batteries as a starting material. It should be understood that the starting material used herein is merely intended to illustrate the present invention instead of limiting the present invention. Various modifications and polishments made to the present invention without departing from the spirit and essence of the present invention shall all fall within the scope of the present invention.

The solar energy thermal reduction apparatus of aluminum hydroxide for an aluminum-air fuel battery according to the present invention includes three systems: a solar energy collection and photothermal conversion system, a reduction system of aluminum hydroxide and a heat recovery and recycle system.

The solar energy collection and photothermal conversion system collects sunlight, concentrates the sunlight, transfers the sunlight, and converts sunlight energy of the solar energy into thermal energy, so as to provide energy for the reduction system of aluminum hydroxide.

The reduction system of aluminum hydroxide dries, grinds and heats to decompose aluminum hydroxide collected upon discharge of the aluminum-air fuel battery, to obtain alumina ($Al_2O_3$); further grinds and preheats the alumina ($Al_2O_3$) and mixes the alumina with a catalyst, transfers the alumina ($Al_2O_3$) mixed with the catalyst to an alumina ($Al_2O_3$) reduction chamber and high-temperature heats the same to a gas state, dissociates the same to ions, generates aluminum and oxygen under the effect of an electric field/magnetic field, separates the aluminum from the oxygen and cools the same, fabricates the aluminum into aluminum sheet electrodes complying with corresponding specifications according to the requirements of the aluminum-air fuel battery, fabricates the oxygen into high-pressure oxygen, liquid oxygen and solid oxygen (the oxygen in these three states may be used as a cathode material for the aluminum-air fuel battery, and may be applied to the outer space, deep sea and the like oxygen-free environment) complying with corresponding specifications according to different requirements, or directly returns the oxygen to the nature.

The heat recovery and recycle system recovers and recycles the heat generated in the process of separating the aluminum from oxygen and cooling the same, and the heat generated in the process of fabricating the aluminum into the aluminum sheet electrodes and fabricating the oxygen into the high-pressure oxygen, the liquid oxygen and the solid oxygen, and transfers a part of the recovered heat to the reduction system of aluminum hydroxide to dry and heat and decompose the aluminum hydroxide and further preheat the alumina ($Al_2O_3$).

Afterwards, the heat recovery and recycle system transfers the remaining part of the recovered heat to a solar energy thermal power generation device, such that the remaining recovered heat is converted into electric energy via a heat engine by semiconductor temperature different power generation.

A part of the generated electric energy may be transferred to the solar energy collection and photothermal conversion system for automation control and maintenance of the solar energy collection and photothermal conversion system, including automatic cleaning of the solar energy collection device, sunlight automatic tracking of the solar energy collection device, automatic alarming in response to damages of the solar energy collection device.

A part of the electric energy may also be transferred to the reduction system of aluminum hydroxide for operation power and automatic control of the reduction system of aluminum hydroxide, including power energy for transferring the aluminum hydroxide collected upon discharge of the aluminum-air fuel battery, power energy for a grinder in an aluminum hydroxide preliminary processing device, power energy for transferring the dried and ground aluminum hydroxide to an aluminum hydroxide decomposition device, power energy for a stirrer and a dehumidifier in an aluminum hydroxide decomposition device, power energy for transferring the decomposed alumina ($Al_2O_3$) to an alumina preheating and catalyzing device, power energy for a stirrer and a grinder in the alumina preheating and catalyzing device, power energy for automatically putting a catalyst, control and power energy for transferring the preheated and ground alumina ($Al_2O_3$) mixed with the catalyst to the alumina reduction chamber, electric power for defining an electric field or magnetic field in the alumina reduction chamber, control and power energy for transferring the reduced aluminum and oxygen from the alumina reduction chamber to an aluminum storage chamber and an oxygen storage chamber, control and power energy for fabricating the reduced aluminum into the aluminum sheet electrodes complying with the corresponding specifications desired by the aluminum-air fuel battery, control and power energy for fabricating the reduced oxygen into the high-pressure oxygen, liquid oxygen and solid oxygen complying with the corresponding specifications, or control and power energy for directly returning the oxygen to the nature.

A part of the electric energy may also be used as daily-consumed electricity for operation personnel of the solar energy thermal reduction apparatus of aluminum hydroxide for an aluminum-air fuel battery.

In addition, the remaining heat upon power generation may also be used as daily consumed thermal energy for the operation personnel of the solar energy thermal reduction apparatus of aluminum hydroxide for an aluminum-air fuel battery and the surrounding residents.

The apparatus according to the present invention is further hereinafter described with reference to the accompanying drawings.

Embodiment 1

I. Solar Energy Collection and Photothermal Conversion System

The solar energy collection and photothermal conversion system is constituted by a solar energy collection device 1, a solar energy concentration device 2, a solar energy transfer device 3, a support and fixing device 4 and the like.

The solar energy collection device 1 is a plate-shaped, a thin-film-shaped, a mesh-shaped or a fiber-shaped structure with a cavity arranged therein that is fabricated by quartz, plastics, glass, organic glass, metal plastics, metal glass, composite materials, biological materials, biological composition materials and the like materials having an extremely high sunlight transmittance (greater than 90%) and an extremely low reflectance (less than 10%) and absorption (less than 1 dB/km). The solar energy collection device 1 may have a rectangular shape, a circular shape, a polygonal shape, or an irregular shape, and the thickness of the solar energy collection device 1 is as follows: millimeter-scale: 0.1-100 mm, micron-scale: 0.1-1000 microns, or nanometer-scale: 0.1-1000 nanometers. One side of the solar energy collection device 1 is in direct contact with the sunlight, and the other side thereof is in close contact with, or is integrally formed with the solar energy concentration device 2. The solar energy collection device 1 collects as much as possible the sunlight and transfers the sunlight to the solar energy concentration device 2. The side of the solar energy collection device 1 by which the solar energy collection device 1 is in contact with the sunlight is provided with an automatic cleaning device (this device is commonly used in the art, which is not illustrated in the drawings). The automatic cleaning device may clear dusts, droplets and contaminants which hinder transmission of the sunlight, and maintains the solar energy collection device 1 to be clean and ensures normal transmission of the sunlight. The solar energy collection device 1 is further provided with a damage-triggered automatic alarming device (this device is commonly used in the art, which is not illustrated in the drawings). When the solar energy collection device 1 is subjected to collisions, impacts, and partial damages caused by natural disasters, an alarm is generated automatically to prompt the maintenance personnel to timely repair, replace and maintain the device, such that the sunlight collection efficiency is ensured. The solar energy collection device 1 may be fabricated as complying with specific specifications and dimensions, and constitutes, together with the solar energy concentration device 2 and the solar energy transfer device 3 complying with the corresponding specifications, a solar energy collection and photothermal conversion unit. The solar energy collection and photothermal conversion system is formed by mounting and fixing at least one solar energy collection and photothermal conversion unit to ground 5 via a support and fixing device 4 or by splicing the solar energy collection and photothermal conversion units.

The solar energy concentration device 2 is a lens structure that is fabricated by quartz, plastics, glass, organic glass, metal plastics, metal glass, composite materials, biological materials, biological composition materials and the like materials having an extremely high sunlight transmittance (greater than 90%) and an extremely low reflectance (less than 10%) and absorption (less than 1 dB/km). The structure may be convex lens structure, a Frenkel lens structure, a concave lens structure, an optical fiber lens structure, a thin lens structure, a multi-lens structure or the like. The solar energy collection device 1 is attached on one side of the solar energy concentration device 2, or one side of the solar energy concentration device 2 is integrally formed with the solar energy collection device 1. In this way, in one aspect, the solar energy collection device 1 transfers the collected sunlight to the solar energy concentration device 2, such that the solar energy concentration device 2 concentrates and focuses the sunlight transferred by the solar energy collection device 1 and transfers the concentrated and focused sunlight to the solar energy transfer device 3; and in another aspect, the solar energy collection device may further protect and maintain the solar energy concentration device 2. The other side of the solar energy concentration device 2 is directly or indirectly connected to the solar energy transfer device 3. The solar energy concentration device 2 may be directly connected to the solar energy transfer device 3 to define an optical fiber lens structure, and the solar energy transfer device 3 is just located at a focal point where the solar energy concentration device 2 concentrates the sunlight. The solar energy concentration device 2 and the solar energy transfer device 3 are coupled to each other via a light conducting material. In this way, the solar energy concentration device 2 and the solar energy transfer device 3 are arranged integrally via the light conducting material. The sunlight is firstly concentrated by the solar energy concentration device 2 and then transferred to the solar energy transfer device 3 via the light conducting material. As such, the sunlight enters the solar energy concentration device 2 from the solar energy collection device 1 and is concentrated by the solar energy concentration device 2, and then enters the solar energy transfer device 3. In this entire process, the sunlight is always transmitted in the light conducting material having an extremely high transmittance. In this way, the loss of the solar energy is extremely low (less than 1%). Therefore, the loss of the sunlight in the concentration process is extremely low, and the solar energy concentration device 2 may be indirectly connected to the solar energy transfer device 3 to define an optical fiber-air-lens structure. The solar energy collection device 1 and the solar energy concentration device 2 are mounted and fixed to the ground 5 via the support and fixing device 4. The solar energy transfer device 3 is also mounted and fixed to the ground 5 via the support and fixing device 4. One end (the end from which the sunlight enters) of the solar energy transfer device 3 is just arranged at the focal point where the solar energy concentration device 2 concentrates the sunlight. Air is present between the solar energy concentration device 2 and the one end (the end from which the sunlight enters) of the solar energy transfer device 3. Therefore, the solar energy concentration device 2 and the solar energy transfer device 3 are indirectly connected. As such, the sunlight enters the solar energy concentration device 2 from the solar energy collection device 1 and is concentrated by the solar energy concentration device 2, and enters the solar energy transfer device 3 via the air. In this entire process, the sunlight is always transmitted in an environment of an extremely high transmittance. The air has a very high light conductivity. Therefore, the loss of the solar energy is extremely low (less than 1%), and the thermal loss of the sunlight in the concentration process is also extremely low. The air herein is clean and purified air, instead of polluted air containing a large number of suspensions and particles.

The solar energy transfer device 3 is a device of a light conducting fiber structure having a higher transmittance, and is a light conducting fiber structure that is fabricated by quartz, plastics, glass, organic glass, metal plastics, metal glass, composite materials, biological materials, biological composition materials and the like materials having an extremely high sunlight transmittance (greater than 90%) and an extremely low reflectance (less than 10%) and absorption (less than 1 dB/km). One end (the end from which the sunlight enters) of the solar energy transfer device is directly or indirectly connected to the solar energy concentration device 2, and the other end (the end from which the sunlight exits) is connected to an alumina ($Al_2O_3$) reduction chamber 15. The sunlight enters the solar energy concentration device 2 from the solar energy collection device 1 and is concentrated by the solar energy concentration device 2, and then enters the alumina ($Al_2O_3$) reduction chamber 15 via transfer by the solar energy transfer device 3. The concentrated sunlight is converted from the photo energy into thermal energy in the alumina ($Al_2O_3$) reduction chamber 15. The alumina ($Al_2O_3$) is heated to dissociate the alumina ($Al_2O_3$), to further improve the thermal reduction process of the alumina ($Al_2O_3$).

A device having a light conducting fiber structure is arranged at the center of the solar energy transfer device 3, and a protection layer and an insulating layer are coated on an outer layer of the solar energy transfer device 3 to prevent damages caused by the ambient environment to the solar energy transfer device 3, for example, water, fires, electric shocks, collisions or the like.

The solar energy collection device 1 has a specific specification and dimension, and may define, together with the solar energy concentration device 2 and the solar energy transfer device 3 complying with the corresponding specifications, a solar energy collection and photothermal conversion unit where a sunlight tracking device (the device is commonly used in the art, which is thus not illustrated in the drawings) may be arranged to improve utilization efficiency of the sunlight.

The support and fixing device 4 is a structure configured to fix and support the solar energy collection and photothermal conversion system, and securely and tightly fix the solar energy collection and photothermal conversion system to the ground 5, such that stable and safe operation of the solar energy collection and photothermal conversion system is ensured. The support and fixing device 4 has a cylindrical shape, a pipe shape, a block shape, a sheet shape, a strip shape or the like shape, and may be fabricated from a steel material, an alloy material, a reinforced concrete material, a plastic material, a plastic steel material, a glass steel material, a wood material or the like.

The ground 5 is a foundation for bearing the device (the solar energy thermal reduction apparatus of aluminum hydroxide for an aluminum-air fuel battery), and maintains the device (the solar energy thermal reduction apparatus of aluminum hydroxide for an aluminum-air fuel battery) to operate in a stable and safe environment. However, the ground 5 is not a limitative structure innovated in the present invention. That is, the device may be detached from the base, and may be applied in a space having a specific height or over a seal level.

II. Reduction System of Aluminum Hydroxide 20

The reduction system of aluminum hydroxide 20 is constituted by an aluminum hydroxide collection and storage chamber 11, an aluminum hydroxide collection grinding and drying chamber 12, an aluminum hydroxide heating and decomposition chamber 13, an alumina grinding preheating and mixing chamber 14, an alumina reduction chamber 15, an electric field/magnetic field generation device 15-3, an aluminum/oxygen separation and cooling device 15-4, an alumina reduction primary control device, an aluminum recovery and storage chamber 16, an oxygen recovery and storage chamber 18, an aluminum sheet electrodes fabrication chamber 17, an oxygen processing chamber 19 and the like structure.

The aluminum hydroxide collection and storage chamber 11 temporarily stores aluminum hydroxide collected upon discharge of the aluminum-air fuel battery, and is a hollow structure capable of accommodating a specific volume and weight of aluminum hydroxide. The aluminum hydroxide collection and storage chamber 11 has a circular shape, a rectangular shape, a polygonal shape, an elliptical shape, an irregular shape or the like, and is fabricated from a metal, a composite material, a bricks and reinforced concrete material, a reinforced concrete material, a plastic material, a plastic steel material or the like. The aluminum hydroxide collection and storage chamber 11 has at least one feed port and at least one outlet port. The feed port and the outlet port may be both turned on or turned off automatically based on control where no material (aluminum hydroxide) is fed. The interior of the aluminum hydroxide collection and storage chamber 11 is relatively isolated from the ambient environment, and the outlet port of the aluminum hydroxide collection and storage chamber 11 is provided with an aluminum hydroxide transfer device 11-1. The aluminum hydroxide transfer device 11-1 is a transfer device whose turn-on and turn-off is automatically controlled. One end of the aluminum hydroxide transfer device 11-1 is connected to the outlet port of the aluminum hydroxide collection and storage chamber 11, and the other end thereof is connected to a feed port of the aluminum hydroxide collection grinding and drying chamber 12. The transfer and control power thereof is originated from the electric energy generated by a solar energy thermal power generation device 34.

The aluminum hydroxide collection grinding and drying chamber 12 is a device integrated with grinding and drying, and may grind the aluminum hydroxide while drying the same. The aluminum hydroxide collection grinding and drying chamber 12 includes at least one grinder and at least one dryer. The grinder is powered by the electric energy generated by the solar energy thermal power generation device 34. The dryer is powered by the electric energy generated by the solar energy thermal power generation device 34. The heat of the dryer is originated from the waste heat released by the alumina reduction chamber 15 and the aluminum/oxygen separation and cooling device 15-4. The waste heat is automatically distributed by a waste heat distribution device 33 after being conducted via a waste heat recovery pipe 31, and is transferred to the dryer in the aluminum hydroxide collection grinding and drying chamber 12 via a heat transfer pipe 32. The aluminum hydroxide collection grinding and drying chamber 12 includes at least one feed port and at least one outlet port. The feed port of the aluminum hydroxide grinding and drying chamber 12 is connected to the aluminum hydroxide transfer device 11-1. The aluminum hydroxide transfer device 11-1 transfers the aluminum hydroxide in the aluminum hydroxide collection and storage chamber 11 to the grinder and the dryer in the aluminum hydroxide collection grinding and drying chamber 12, fabricates the transferred aluminum hydroxide into dry powder (which is also referred to as aluminum hydroxide dry powder), and then discharges the aluminum hydroxide dry powder from the outlet port of the aluminum hydroxide collection grinding and drying chamber 12. The aluminum hydroxide dry powder enters an aluminum hydroxide dry powder transfer device 12-1. The outlet port of the aluminum hydroxide collection grinding and drying chamber 12 is integrally connected to the aluminum hydroxide dry powder transfer device 12-1. The aluminum hydroxide dry powder transfer device 12-1 is a transfer device whose turn-on or turn-off is automatically controlled. One end of the aluminum hydroxide dry powder transfer device 12-1 is connected to the outlet port of the aluminum hydroxide collection grinding and drying chamber 12, and the other end thereof is connected to a feed port of the aluminum hydroxide heating and decomposition chamber 13. Transfer and control power of the aluminum hydroxide dry powder transfer device 12-1 is originated from the electric energy generated by the solar energy thermal power generation device 34.

The aluminum hydroxide heating and decomposition chamber 13 is a chemical reaction device in which the aluminum hydroxide is heated and decomposed into alumina and water, and has the functions of stirring and heating. The aluminum hydroxide heating and decomposition chamber 13 is provided with a heating device, a stirring device and a dehumidifying device. These devices are all powered by the electric energy generated by the solar energy thermal power generation device 34. The heat of the heating device is originated from the waste heat released by the alumina reduction chamber 15 and the aluminum/oxygen separation and cooling device 15-4. The waste heat is automatically distributed by the waste heat distribution device 33 after being conducted via the waste heat recovery pipe 31, and then transferred to the heating device in the aluminum hydroxide heating and decomposition chamber 13 via the heat transfer pipe 32. The aluminum hydroxide heating and decomposition chamber 13 includes at least one feed port, at least one outlet port, and at least one moisture discharge port 13-2.

The feed port of the aluminum hydroxide heating and decomposition chamber 13 is connected to the aluminum hydroxide dry powder transfer device 12-1. The aluminum hydroxide dry powder is transferred by the aluminum hydroxide heating and decomposition chamber 13 via the aluminum hydroxide dry powder transfer device 12-1.

The outlet port of the aluminum hydroxide heating and decomposition chamber 13 is connected to an alumina transfer device 13-1. The alumina generated upon decomposition of the aluminum hydroxide is transferred to the alumina grinding preheating and mixing chamber 14 via the alumina transfer device 13-1.

One end of the moisture discharge port 13-2 is connected to the dehumidifying device, and the other end thereof is in communication with the ambient environment. The dehumidifying device discharges the water generated upon decomposition of the aluminum hydroxide via the moisture discharge port.

The aluminum hydroxide is decomposed at a temperature of 200° C.-1000° C. At different temperatures, the generated alumina has different crystal structures. Therefore, the waste heat distribution device 33 may automatically regulate the temperature based on stages, such that the generated alumina is more simply ground in the alumina grinding preheating and mixing chamber 14, and mixed with a catalyst.

A high-temperature resistant material is arranged on an inner side of the aluminum hydroxide heating and decomposition chamber 13, and a heat preservation material is arranged on a housing of the aluminum hydroxide heating and decomposition chamber 13, to reduce heat loss and prolong life time of the device. The moisture discharge port 13-2 of the aluminum hydroxide heating and decomposition chamber 13 is provided with a heat recovery device.

The alumina grinding preheating and mixing chamber 14 prepares for decomposition of the aluminum hydroxide, further grinds the alumina and mixes the alumina with the catalyst, and further heats the alumina from 200° C.-1000° C. to 1000° C.-1500° C. or even higher temperatures.

A high-temperature resistant material is arranged on an inner side of the alumina grinding preheating and mixing chamber 14, and a heat preservation material is arranged on a housing of the alumina grinding preheating and mixing chamber, to reduce heat loss and prolong life time of the device.

The alumina grinding preheating and mixing chamber 14 includes at least one high-temperature resistant grinding and heating device, at least one feed port, at least one outlet port, and at least one catalyst feeding device 14-2.

The grinding and heating device is powered by the electric energy generated by the solar energy thermal power generation device 34, and the heat of the grinding and heating device is originated from the waste heat released by the alumina reduction chamber 15 and the aluminum/oxygen separation and cooling device 15-4. The waste heat is automatically distributed by the waste heat distribution device 33 after being conducted via the waste heat recovery pipe 31, and is then transferred to the grinding and heating device in the alumina grinding preheating and mixing chamber 14 via the heat transfer pipe 32.

The feed port of the alumina grinding preheating and mixing chamber 14 is connected to the alumina transfer device 13-1.

The outlet port of the alumina grinding preheating and mixing chamber 14 is connected to a preformed alumina transfer device 14-1. The alumina discharged from the outlet port of the alumina grinding preheating and mixing chamber 14 is further ground and heated to 1000° C.-1500° C., and mixed with the catalyst (which is referred to as preformed alumina).

The catalyst feeding device 14-2 in the alumina grinding preheating and mixing chamber 14 is a catalyst storage and automatic feeding device, wherein the catalysts fed may include: platinum catalysts, titanium catalysts and the like catalysts. According to different conditions, a catalyst may be fed or no catalyst may be fed.

The preformed alumina transfer device 14-1 is a transfer device whose turn-on or turn-off is automatically controlled. One end of the preformed alumina transfer device 14-1 is connected to the outlet port of the alumina grinding preheating and mixing chamber 14, and the other end thereof is connected to the feed port of the alumina reduction chamber 15. A high-temperature resistant switch 14-3 and a high-temperature resistant switch controller 14-4 are arranged at a position where the other end of the preformed alumina transfer device 14-1 is connected to the feed port of the alumina reduction chamber 15. By using the high-temperature resistant switch 14-3 and the high-temperature resistant switch controller 14-4, the preformed alumina may be securely transferred to the alumina reduction chamber 15. The high-temperature resistant switch 14-3 is fabricated from a high-temperature resistant material, which may be tungsten, magnesia, graphite, boron nitride and the like material.

The alumina reduction chamber 15 is a place where the aluminum hydroxide is reduced, and is also a place where the solar energy is converted into the thermal energy. The alumina reduction chamber 15 is a hollow device, which is resistant to high temperatures, has a cylindrical shape, a columnar shape, a prism shape and an irregular shape, and is fabricated from one or more of the materials including tungsten, magnesia, graphite and boron nitride or a composite material thereof. A housing 15-1 of the alumina reduction chamber 15 is provided with a high-temperature resistant material. The alumina reduction chamber 15 is filled with an inert gas, which may be helium, argon, neon or the like. The alumina reduction chamber 15 may also be deployed in a vacuum environment, which facilitates evaporation (gasification) and dissociation of the alumina.

When the preformed alumina is transferred to the alumina reduction chamber 15, under irradiation by the sunlight concentrated by the solar energy collection and photothermal conversion system 10, the solar energy is converted into the thermal energy, the alumina is heated to about 2900° C. and starts being evaporated gasified and dissociated. Finally, under the effect of the catalyst, the alumina is dissociated into aluminum ions ($AL^{3+}$) and oxygen ions ($O^{2-}$).

A side region of the alumina reduction chamber 15 is connected to the solar energy collection and photothermal conversion system 10 via the solar energy transfer device 3, and transfers the sunlight concentrated by the solar energy collection and photothermal conversion system 10 to a heating region 15-2 in the alumina reduction chamber 15. The temperature in the heating region shall reach the temperature for gasifying an oxide, for example, over 3000° C.

A middle region of the alumina reduction chamber 15 is provided with an electric field/magnetic field. The electric field/magnetic field is generated by the electric field/magnetic field generation device 15-3. The energy desired for generating the electric field/magnetic field is originated from the electric energy generated by the solar energy thermal power generation device 34.

Another side region of the alumina reduction chamber 15 is provided with the aluminum/oxygen separation and cooling device 15-4. The aluminum/oxygen separation and cooling device 15-4 is connected to the waste heat recovery pipe 31. The waste heat recovery pipe 31 conducts the waste heat released by the aluminum/oxygen separation and cooling device 15-4 to the waste heat distribution device 33. The waste heat distribution device 33 distributes the waste heat to the aluminum hydroxide grinding and drying chamber 12, the aluminum hydroxide heating and decomposition chamber 13, the aluminum hydroxide grinding preheating and mixing chamber 14 and the solar energy thermal power generation device 34 according to different needs for heating and power generation, such that the waste heat is recycled and reused.

The alumina is dissociated into aluminum ions ($AL^{3+}$) and oxygen ions ($O^{2-}$) in the heating region 15-2 in the alumina reduction chamber 15; the aluminum ions ($AL^{3+}$) and the oxygen ions ($O^{2-}$) are diffused towards a low temperature region formed by the heat released by the aluminum/oxygen separation and cooling device 15-4; during the diffusion movement, the aluminum ions ($AL^{3+}$) and the oxygen ions ($O^{2-}$) pass through the electric field/magnetic field region generated by the electric field/magnetic field generation device 15-3; the high-temperature aluminum ions ($AL^{3+}$) and oxygen ions ($O^{2-}$) moves towards different directions under the effect of the electric field/magnetic field; in this case, collisions between the high-temperature aluminum ions ($AL^{3+}$) and oxygen ions ($O^{2-}$) are being reduced, collisions between the aluminum ions ($AL^{3+}$) are being increased, and collisions between the oxygen ions ($O^{2-}$) are being increased; and with further cooling by the aluminum/oxygen separation and cooling device 15-4, the temperature is lowered, aluminum is formed in a region where the aluminum ions ($AL^{3+}$) are aggregated, and oxygen molecules are formed in a region where the oxygen ions ($O^{2-}$) are aggregated. In this way, the aluminum is in a liquid state and the oxygen is in a gaseous state.

An aluminum discharge port and an oxygen discharge port are arranged on the alumina reduction chamber 15. The aluminum discharge port is connected to the aluminum recovery and storage chamber 16. The oxygen discharge port is connected to the oxygen recovery and storage chamber 18. The aluminum recovery and storage chamber 16 is provided with an aluminum transfer device 16-2 and an aluminum heat dissipation device 16-3. The aluminum transfer device 16-2 suctions the aluminum liquid in the alumina reduction chamber 15 into the metal recovery and storage chamber 16. In addition, under a cooling effect of the aluminum heat dissipation device 16-3, the temperature of the aluminum is further lowered, and the aluminum is temporarily stored into the metal recovery and storage chamber 16.

Likewise, the oxygen recovery and storage chamber 18 is provided with an oxygen transfer device 18-2 and an oxygen heat dissipation device 18-3. The oxygen transfer device 18-2 suctions the oxygen in the alumina reduction chamber 15 into the oxygen recovery and storage chamber 18. In addition, under a cooling effect of the oxygen heat dissipation device 18-3, the temperature of the oxygen is further lowered and the pressure is further lowered, and the oxygen is temporarily stored into the oxygen recovery and storage chamber 18.

The metal recovery and storage chamber 16 is a hollow heat preservation box structure, and a heat preservation material is arranged on a housing 16-1 of the metal recovery and storage chamber 16. The metal recovery and storage chamber 16 includes at least one feed port and at least one outlet port. The feed port of the metal recovery and storage chamber 16 is connected to an aluminum sheet electrode transfer device 17-1. The aluminum sheet electrode transfer device 17-1 transfers the aluminum in the metal recovery and storage chamber 16 to the aluminum sheet electrodes fabrication chamber 17. In the aluminum sheet electrodes fabrication chamber 17, the aluminum is fabricated into aluminum sheet electrodes having specifications desired by the aluminum-air fuel battery.

The oxygen recovery and storage chamber 18 is a hollow heat-preservation pressure container structure. A heat preservation material is arranged on a housing 18-1 of the oxygen recovery and storage chamber 18. The oxygen recovery and storage chamber 18 includes at least one feed port and at least one outlet port. The feed port of the oxygen recovery and storage chamber 18 is connected to the oxygen transfer device 18-2. The outlet port of the oxygen recovery and storage chamber 18 is connected to an oxygen processing and transfer device 19-1 of the oxygen processing chamber 19. The oxygen processing and transfer device 19-1 transfers the oxygen in the oxygen recovery and storage chamber 18 to the oxygen processing chamber 19. In the oxygen processing chamber 19, the oxygen is fabricated into high-pressure oxygen, liquid oxygen and solid oxygen having the corresponding specifications according to different needs, or the oxygen is directly returned to the nature.

The alumina recovery primary control device is configured to control the entire process of the alumina in the reduction system of aluminum hydroxide 20, including heating, gasification, dissociation, decomposition, cooling and transportation, and ensure completion of the thermal reduction of the alumina without any manual intervention.

An aluminum sheet electrode warehouse 17-2 is configured to store the fabricated aluminum sheet electrodes.

An aluminum sheet electrode finished product transfer device 17-3 is configured to transfer the aluminum sheet electrodes fabricated in the aluminum sheet electrode fabrication chamber 17 to the aluminum sheet electrode warehouse 17-2 by transportation, conveyor belts or the like for classification and arrangement.

An oxygen finished product warehouse 19-2 is configured to store the fabricated high-pressure oxygen, liquid oxygen and solid oxygen.

An oxygen finished product transfer device 19-3 is configured to transfer the high-pressure oxygen, liquid oxygen and solid oxygen fabricated in the oxygen processing chamber 19 to the oxygen finished product warehouse 19-2 by transportation, conveyor belts or the like for classification and arrangement.

III. Thermal Energy Recovery and Recycle System

The thermal energy recovery and recycle system includes the waste heat recovery pipe 31, a heat transfer pipe 32, a waste heat distribution device 33, and a solar energy thermal power generation device 34. The waste heat recovery pipe 31 and the heat transfer pipe 32 are fabricated from a material having a high heat conductivity, which may be a superconducting heat pipe, a heat pipe, an aluminum metal, a silver metal or the like. Especially, the superconducting heat pipe has a very high heat conductivity, and heat loss during heat transfer is very small and approximately 0. Therefore, the superconducting heat pipe is preferably used. The waste heat distribution device 33 is a heat control system, and may distribute the heat to the aluminum hydroxide collection grinding and drying chamber 12, the aluminum hydroxide heating and decomposition chamber 13, the alumina grinding preheating and mixing chamber 14 and the solar energy thermal power generation device 34 for heating and power generation, such that the waste heat is recycled and reused. The solar energy thermal power generation device 34 is a thermal power generation device, which may be a turbine power generator, a semiconductor temperature difference power generator, a phase change power generation or the like. The electric energy generated by the solar energy thermal power generation device 34 may be supplied to the device according to the present invention. Alternatively, a part of the electric energy may be used as daily-consumed electricity for operation personnel of the solar energy thermal reduction apparatus of aluminum hydroxide for an aluminum-air fuel battery.

In addition, the remaining heat upon power generation may also be used as daily consumed thermal energy for the operation personnel of the solar energy thermal reduction apparatus of aluminum hydroxide for an aluminum-air fuel battery and the surrounding residents.

Embodiment 2

The structure in this embodiment is similar to that in embodiment 1. The difference lies in that in this embodiment, the solar energy transfer device 3 is replaced by a photothermal conversion transfer device (FIG. 2).

Figure 2:
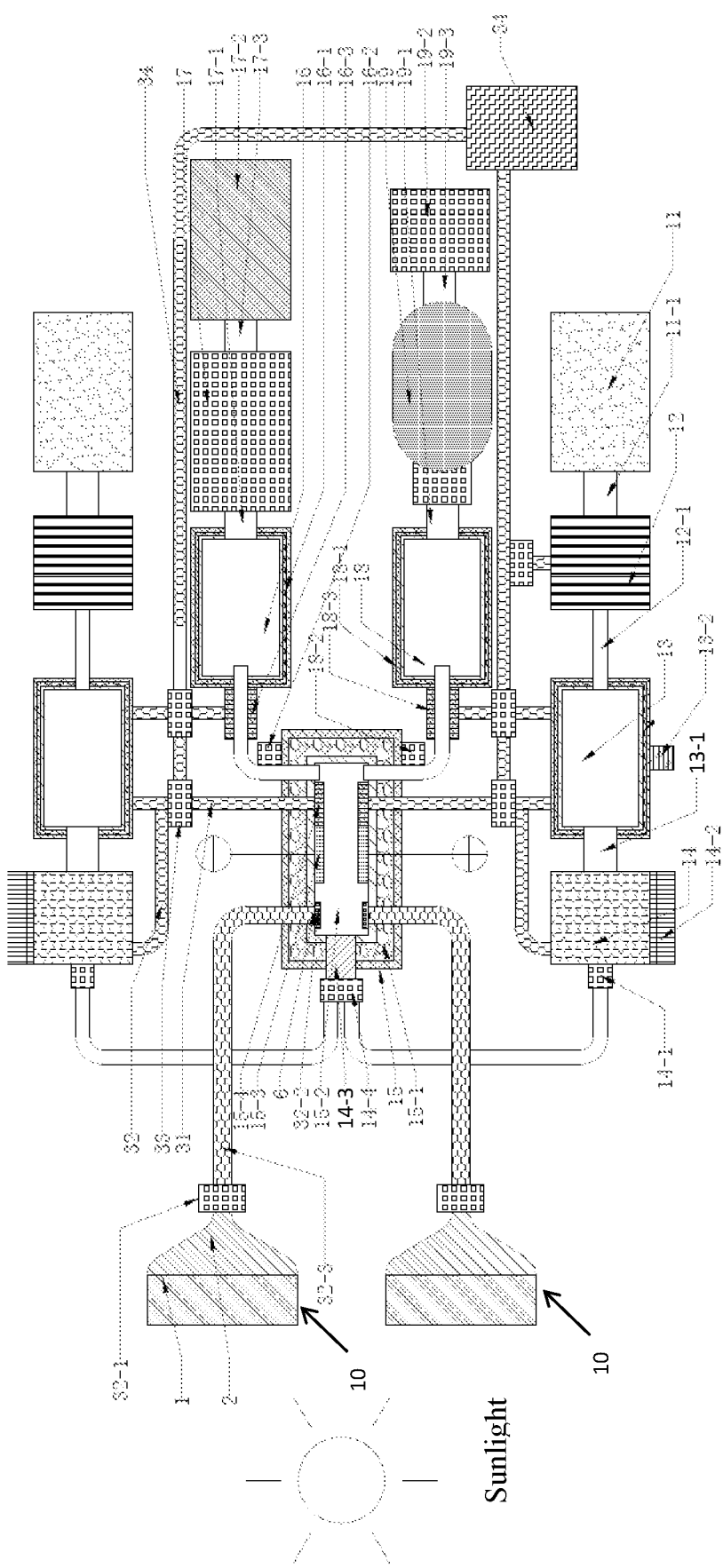
FIG. 2 is a schematic structural view illustrating replacing a solar energy transfer device 3 with a heat transfer pipe 32-3 in the solar energy thermal reduction apparatus of aluminum hydroxide for an aluminum-air fuel battery according to the present invention.
Figure 3:
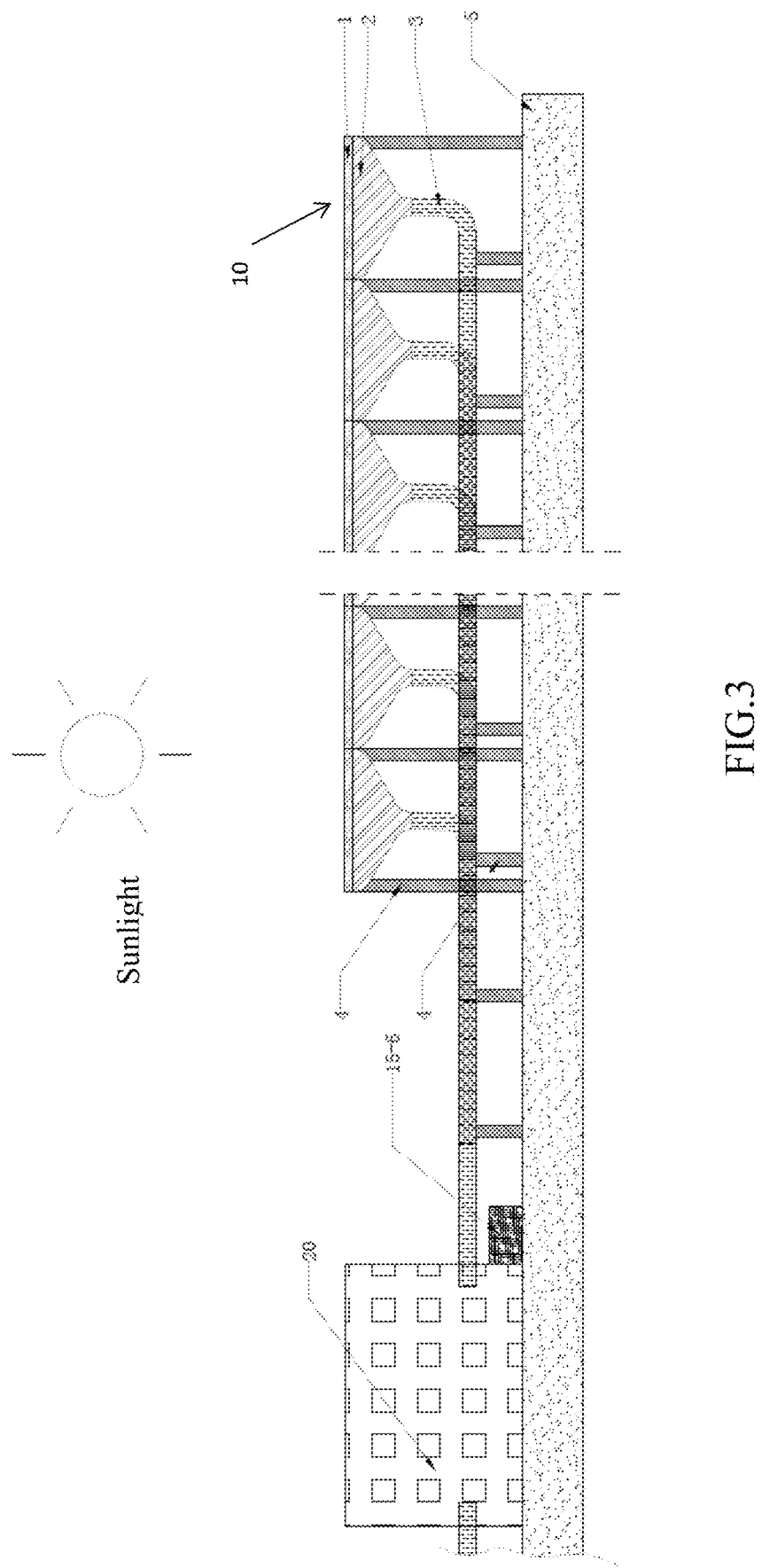
FIG. 3 is a schematic structural view of a solar energy collection and photothermal conversion system 10 in the solar energy thermal reduction apparatus of aluminum hydroxide for an aluminum-air fuel battery according to the present invention.
Figure 4:
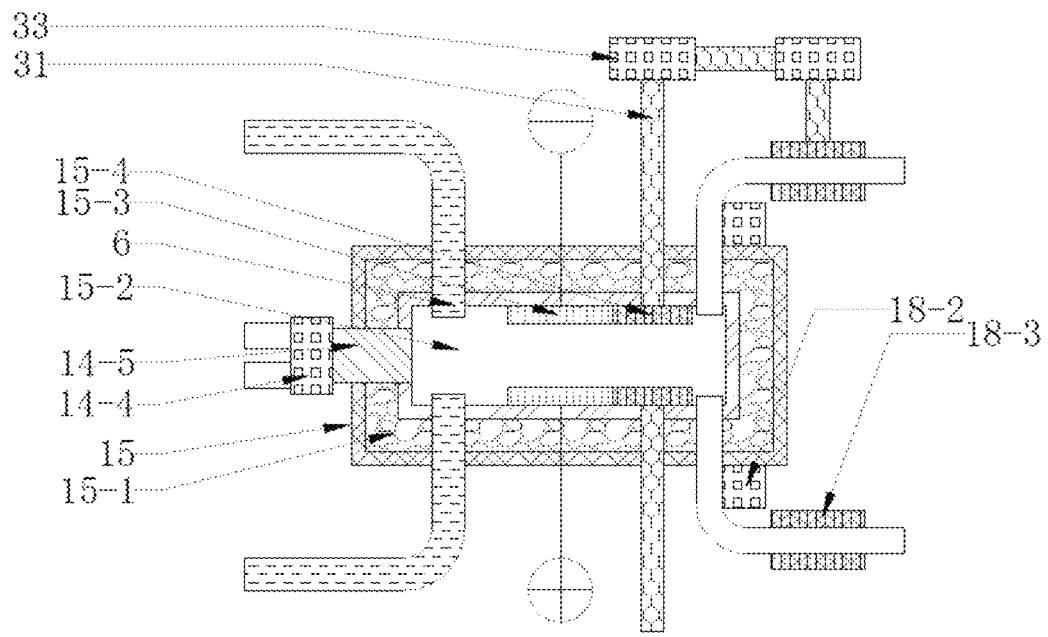
FIG. 4 is a schematic structural view of an alumina 15 reduction chamber in the solar energy thermal reduction apparatus of aluminum hydroxide for an aluminum-air fuel battery according to the present invention.
Figure 5:
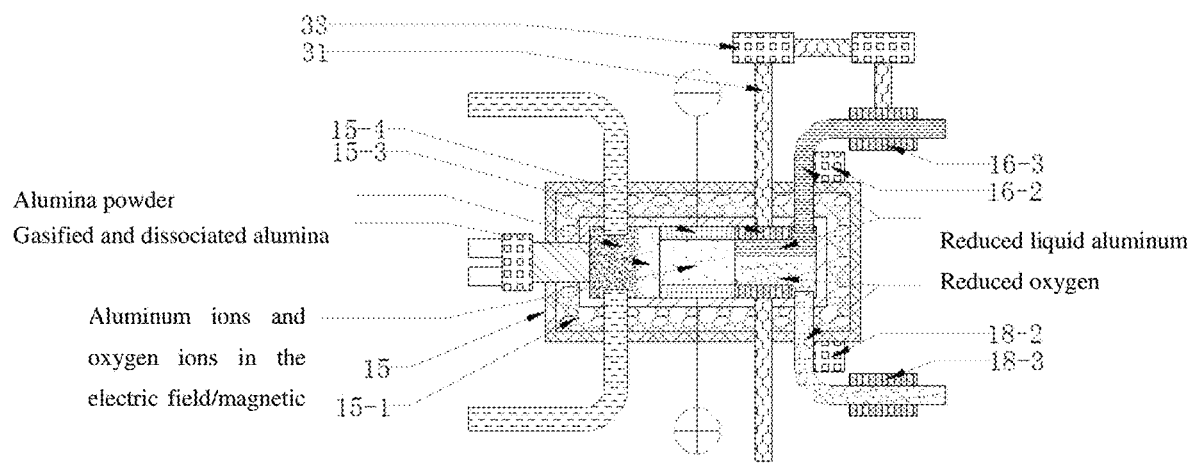
FIG. 5 is a schematic structural view illustrating gasifying, dissociating and reducing alumina into aluminum and oxygen, and recovery and storage of the aluminum and oxygen in the alumina reduction chamber 15 in the solar energy thermal reduction apparatus of aluminum hydroxide for an aluminum-air fuel battery according to the present invention.
Figure 6:
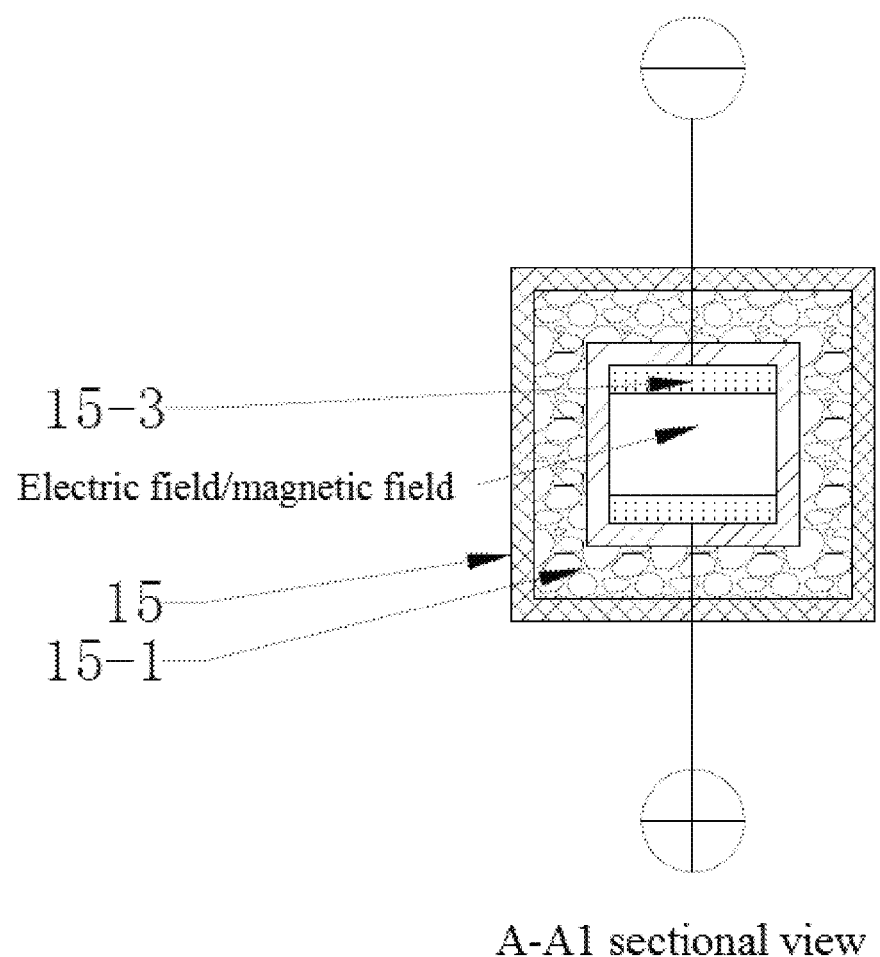
FIG. 6 is a sectional view taken along an A-A1 direction of an electric field/magnetic field in a middle region in the alumina reduction chamber 15 in the solar energy thermal reduction apparatus of aluminum hydroxide for an aluminum-air fuel battery according to the present invention.
Figure 7:
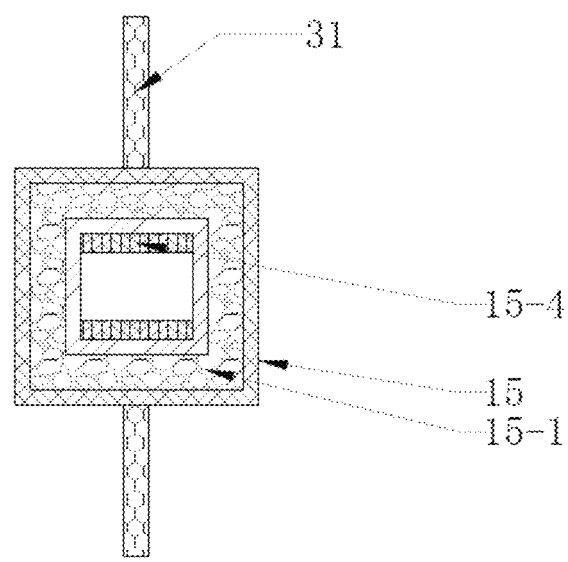
FIG. 7 is a sectional view taken along a B-B1 direction in a region in an aluminum/oxygen separation and cooling device 15-4 in the alumina reduction chamber 15 in the solar energy thermal reduction apparatus of aluminum hydroxide for an aluminum-air fuel battery according to the present invention.

FIG. 2 illustrates a structure of replacing the solar energy transfer device 3 with a heat transfer pipe 32 in the solar energy thermal reduction apparatus of aluminum hydroxide for an aluminum-air fuel battery according to the present invention. With this structure, the thermal energy converted from the solar energy concentrated by the solar energy concentration device 2 is transferred to the alumina reduction chamber 5. A heat transfer pipe 32-3 has the shape, structure and material that are the same as those of the transfer pipe 32. A superconducting heat pipe is preferably used.

A solar energy photothermal conversion device 32-1 is arranged at the end where the heat transfer pipe 32-3 is connected to the solar energy concentration device 2. The solar energy photothermal conversion device 32-1 may high efficiently convert the solar energy into the thermal energy (an efficiency greater than 80%), with an extremely low reflectance (1%) and an extremely high absorption (greater than 80%). The high-temperature resistant material may be metals, glass, plastics, metal oxides, oxides, nitrides, compositions or the like. The solar energy photothermal conversion device 32-1 may be fabricated from any one of the above materials or a composition material thereof. The solar energy photothermal conversion device 32-1 may a coating of a nano material which is coated on one end of the solar energy photothermal conversion device 32-1. The solar energy photothermal conversion device 32-1 converts the sunlight concentrated by the solar energy concentration device 2 into the thermal energy, and then transfers the thermal energy to the heat transfer pipe 32-3. The heat transfer pipe 32-3 then transfers the heat to the alumina reduction chamber 15.

A heat release device 32-2 is arranged at the end where the heat transfer pipe 32-3 is connected to the alumina reduction chamber 15. The heat release device 32-2 quickly releases the heat transferred by the heat transfer pipe 32-2 to the alumina in the alumina reduction chamber 15, such that the temperature of the alumina is quickly increased, and the alumina is gasified and dissociated. The heat release device 32-2 is fabricated from a material releasing heat quickly and being resistant to high temperatures, which may be metals, metal oxides, oxides, nitrides, compositions or the like. The heat release device 32-2 is fabricated from any one of these materials or a composition thereof. The heat release device 32-2 may be a coating of a nano material which is coated on one end of the solar energy photothermal conversion device 32-3. The heat release device 32-2 may also be a mesh structure, a tree structure, a sheet structure or the like, and may quickly transfer the heat transferred by the solar energy photothermal conversion device 32-3 to the alumina in the alumina reduction chamber 15.

With respect to the solar energy photothermal conversion device 32-1 and the heat release device 32-2, the structure of replacing the solar energy transfer device 3 with the solar transfer pipe 32-3 in the solar energy thermal reduction apparatus of aluminum hydroxide for an aluminum-air fuel battery according to the present invention may also not be used. One end of the heat transfer pipe 32-3 is just at a focal point of the solar energy concentration device 2. The sunlight concentrated by the solar energy concentration device 2 is just irradiated to one end of the thermal transfer pipe 32-3, such that the solar energy is converted into the thermal energy. The thermal transfer pipe 32-3 quickly (close to the light speed) transfers the converted thermal energy to the other end of the thermal transfer pipe 32-3 and the end where the alumina reduction chamber 15 is connected, and transfers at this end the heat to the alumina in the alumina reduction chamber 15.

The solar energy thermal reduction apparatus of aluminum hydroxide for an aluminum-air fuel battery according to the present invention may also be applied to reduction of products resulted from discharge of anode materials of the other metal-air fuel batteries.

Specifically, the solar energy thermal reduction apparatus according to the present invention may also be applied to solar energy thermal reduction of zinc hydroxide for a zinc-air fuel battery. In this practice, solar energy reduction of the zinc hydroxide for the zinc-air fuel battery may be achieved only by lowering the temperature in the alumina reduction chamber 15 to a temperature range (1950° C.-2100° C.) in which the zinc oxide is gasified and dissociated. In addition, the solar energy thermal reduction apparatus according to the present invention may also be applied to solar energy thermal reduction of magnesium hydroxide for a magnesium-air fuel battery, solar energy thermal reduction of iron hydroxide for an iron-air fuel battery, solar energy thermal reduction of magnesium hydroxide for a magnesium-air fuel battery, and reduction of products resulted by discharge of anode materials of other metal-air fuel batteries.

INDUSTRIAL APPLICABILITY

The solar energy thermal reduction apparatus according to the present invention may be applied to reduction of products resulted by discharge of anode materials of other metal-air fuel batteries, and thus has industrial applicability.

What is claimed is:

1. An apparatus for preparing a metal based on solar energy thermal reduction, comprising a solar energy collection and photothermal conversion system and a thermal reduction system; wherein
   the solar energy collection and photothermal conversion system comprises: a solar energy collection device, a solar energy concentration device, and a solar energy transfer device wherein the solar energy collection device is configured to collect sunlight, the solar energy concentration device is connected to the solar energy collection device and is configured to concentrate the collected sunlight, the solar energy transfer device is connected to the solar energy collection device and is configured to transfer the concentrated sunlight and convert concentrated solar energy into thermal energy and transfer the thermal energy; and
   the thermal reduction system comprises: a metal reduction chamber, an electric field and/or magnetic field generation device, and a separation and cooling device, wherein the metal reduction chamber is connected to the solar energy collection and photothermal conversion system and is configured to receive the solar energy or the thermal energy converted from the solar energy such that a metal oxide therein is heated and decomposed to form a decomposed product, the electric field and/or magnetic field generation device is configured to generate an electric field/magnetic field and separate the decomposed product, and the separation and cooling device is configured to form a low temperature region for cooling the decomposed product and respectively generating a liquid metal and a gaseous oxygen.

2. The apparatus for preparing a metal based on solar energy thermal reduction according to claim 1, wherein a side region of the metal reduction chamber is connected to the solar energy transfer device, and is configured to transfer the sunlight concentrated by the solar energy collection device or the thermal energy converted from the solar energy to a heating region in an alumina reduction chamber.

3. The apparatus for preparing a metal based on solar energy thermal reduction according to claim 2, wherein the electric field/magnetic field is located in a middle region in the metal reduction chamber.

4. The apparatus for preparing a metal based on solar energy thermal reduction according to claim 3, wherein the separation and cooling device is located on another side region of the metal reduction chamber.

5. The apparatus for preparing a metal based on solar energy thermal reduction according to claim 1, wherein the metal reduction chamber comprises a metal discharge port and an oxygen discharge port.

6. The apparatus for preparing a metal based on solar energy thermal reduction according to claim 1, further comprising a metal oxide grinding and pre-heating mixing chamber, wherein the metal oxide grinding and pre-heating mixing chamber comprises a feed port, an outlet port and a catalyst feed device, a grinding device is arranged in the metal oxide grinding and pre-heating mixing chamber, and a heating device is arranged on a wall of the mixing chamber, the outlet port of the metal oxide grinding and pre-heating mixing chamber being connected to a feed port of the metal reduction chamber.

7. The apparatus for preparing a metal based on solar energy thermal reduction according to claim 6, further comprising a metal hydroxide heating and decomposition chamber, wherein the metal hydroxide heating and decomposition chamber comprises a feed port, an outlet port and a dehumidification device, a stirring device is arranged in the metal hydroxide heating and decomposition chamber, and a heating device is arranged on a wall of the metal hydroxide heating and decomposition chamber, the outlet port of the metal hydroxide heating and decomposition chamber being connected to the feed port of the metal oxide grinding and preheating mixing chamber via a metal oxide transfer device.

8. The apparatus for preparing a metal based on solar energy thermal reduction according to claim 7, further comprising a metal hydroxide collection grinding and drying chamber, wherein the metal hydroxide collection grinding and drying chamber comprises a feed port and an outlet port, and a grinder and a dryer are arranged in the metal hydroxide collection grinding and drying chamber, the outlet port of the metal hydroxide collection grinding and drying chamber being connected to the feed port of the metal hydroxide heating and decomposition chamber via a metal hydroxide dry powder transfer device.

9. The apparatus for preparing a metal based on solar energy thermal reduction according to claim 8, further comprising a metal hydroxide collection and storage chamber, wherein the metal hydroxide collection and storage chamber comprises a feed port and an outlet port, the outlet port of the metal hydroxide collection and storage chamber being connected to the feed port of the metal hydroxide collection grinding and drying chamber via a metal hydroxide transfer device.

10. The apparatus for preparing a metal based on solar energy thermal reduction according to claim 1, further comprising a metal recovery and storage chamber, wherein the metal recovery and storage chamber is connected to the metal discharge port of the metal reduction chamber, and a metal transfer device and a metal heat dissipation device are arranged on the metal recovery and storage chamber, the metal transfer device being configured to suction a metal liquid in the metal reduction chamber into the metal recovery and storage chamber, such that a temperature of the metal is further lowered under a cooling effect of the metal heat dissipation device, and the metal is stored into the metal recovery and storage chamber.

11. The apparatus for preparing a metal based on solar energy thermal reduction according to claim 10, further comprising a metal electrode preparation chamber, wherein the metal is transferred from the metal recovery and storage chamber to the metal electrode preparation chamber via an electrode transfer device, and the metal is prepared into a metal electrode having a desired specification in the metal electrode preparation chamber.

12. The apparatus for preparing a metal based on solar energy thermal reduction according to claim 10, wherein the metal recovery and storage chamber is a hollow heat preservation box structure, and a housing of the metal recovery and storage chamber comprises a heat preservation material.

13. The apparatus for preparing a metal based on solar energy thermal reduction according to claim 1, wherein the solar energy transfer device comprises a heat transfer pipe, a solar energy photothermal conversion device being arranged at one end of the heat transfer pipe by which the heat transfer pipe is connected to the solar energy concentration device and configured to convert light energy into thermal energy, and a heat release device being arranged on the other end of the heat transfer pipe and connected to the metal reduction chamber.

14. The apparatus for preparing a metal based on solar energy thermal reduction according to claim 1, wherein the solar energy transfer device is a heat transfer pipe, one end of the heat transfer pipe being located at a focus of the solar energy concentration device, and the other end of the heat transfer pipe being connected to the metal reduction chamber.

15. The apparatus for preparing a metal based on solar energy thermal reduction according to claim 13, wherein the heat transfer pipe is a superconducting heat pipe.

16. The apparatus for preparing a metal based on solar energy thermal reduction according to claim 1, wherein the solar energy collection device, the solar energy concentration device, the solar energy transfer device constitutes a photothermal conversion cell, and the solar energy collection photothermal conversion system comprises a plurality of such photothermal conversion cells.

17. The apparatus for preparing a metal based on solar energy thermal reduction according to claim 16, further comprising a support and fixing device configured to support and fix the photothermal conversion cells.

18. The apparatus for preparing a metal based on solar energy thermal reduction according to claim 1, wherein the solar energy collection device, the solar energy concentration device and the solar energy transfer device are closely connected or integrally arranged.

19. The apparatus for preparing a metal based on solar energy thermal reduction according to claim 1, wherein one end of the solar energy transfer device by which the solar energy transfer device is connected to the solar energy concentration device is located at a focus of the solar energy concentration device.

20. The apparatus for preparing a metal based on solar energy thermal reduction according to claim 1, wherein one side of the solar energy collection device by which the solar energy collection device collects the sunlight is provided with an automatic cleaning device.

21. The apparatus for preparing a metal based on solar energy thermal reduction according to claim 1, further comprising a sunlight automatic tracking device, wherein the sunlight automatic tracking device is configured to control directions of the solar energy collection device and the solar energy concentration device, such that more sunlight enters the solar energy collection device.

22. The apparatus for preparing a metal based on solar energy thermal reduction according to claim 1, wherein the solar energy collection device is provided with a damage-triggered automatic alarming device.

23. The apparatus for preparing a metal based on solar energy thermal reduction according to claim 1, further comprising an oxygen recovery and storage chamber, wherein the oxygen recovery and storage chamber is provided with an oxygen transfer device and an oxygen heat dissipation device, the oxygen transfer device being configured to suction oxygen in the metal reduction chamber into the oxygen recovery and storage chamber, such that a temperature of the oxygen is further lowered under a cooling effect of the oxygen heat dissipation device, and the oxygen is temporarily stored into the oxygen recovery and storage chamber.

24. The apparatus for preparing a metal based on solar energy thermal reduction according to claim 23, wherein a housing of the oxygen recovery and storage chamber comprises a heat preservation material, and the oxygen recovery and storage chamber comprises a feed port and an outlet port, the feed port of the oxygen recovery and storage chamber being connected to an oxygen transfer device, the outlet port of the oxygen recovery and storage chamber being connected to an oxygen processing and transfer device, and the oxygen processing and transfer device being configured to transfer oxygen in the oxygen recovery and storage chamber to a oxygen processing chamber.

25. The apparatus for preparing a metal based on solar energy thermal reduction according to claim 1, further comprising a heat recovery and recycle system, wherein the heat recovery and recycle system comprises a waste heat recovery pipe, a heat transfer pipe, a waste heat distribution device and a solar energy thermal power generation device, the waste heat recovery pipe being connected to a cooling and/or heat dissipation device in the apparatus for preparing a metal based on solar energy thermal reduction and configured to transfer the heat via the heat transfer pipe, and the waste heat distribution device being configured to distribute the heat to a heat and/or thermal power generation device for power generation.

26. The apparatus for preparing a metal based on solar energy thermal reduction according to claim 1, wherein the prepared metal is aluminum, zinc, magnesium, lithium, iron or sodium.

\* \* \* \* \*